United States Patent
Hofmann

(10) Patent No.: US 8,398,174 B2
(45) Date of Patent: Mar. 19, 2013

(54) SEAT CUSHION WITH FOAMED-IN FASTENING ELEMENT

(75) Inventor: Manfred Hofmann, Hettstadt (DE)

(73) Assignee: F. S. Fehrer Automotive GmbH, Kitzingen (DE)

( * ) Notice: Subject to any disclaimer, the term of this patent is extended or adjusted under 35 U.S.C. 154(b) by 323 days.

(21) Appl. No.: 12/877,525

(22) Filed: Sep. 8, 2010

(65) Prior Publication Data

US 2011/0080032 A1    Apr. 7, 2011

(30) Foreign Application Priority Data

Oct. 1, 2009   (DE) .......................... 10 2009 043 673
Oct. 28, 2009  (DE) .......................... 10 2009 051 059

(51) Int. Cl.
*A47C 7/02* (2006.01)

(52) U.S. Cl. ............... 297/452.6; 297/218.1; 297/218.2; 297/218.4; 297/218.5

(58) Field of Classification Search ............... 297/218.1, 297/218.2, 218.4, 218.5, 452.58, 452.6
See application file for complete search history.

(56) References Cited

U.S. PATENT DOCUMENTS

| | | | | |
|---|---|---|---|---|
| 3,630,572 A | * | 12/1971 | Homier | 297/452.6 |
| 3,961,823 A | * | 6/1976 | Caudill, Jr. | 297/452.6 |
| 4,332,419 A | * | 6/1982 | Vogel | 297/440.22 |
| 4,337,931 A | * | 7/1982 | Mundell et al. | 267/102 |
| 4,452,488 A | * | 6/1984 | Rugienius | 297/452.6 |
| 6,609,752 B2 | * | 8/2003 | Inoue | 297/217.3 |
| 6,668,429 B2 | * | 12/2003 | Fujisawa et al. | 24/303 |
| 2003/0001421 A1 | * | 1/2003 | Schmidt | 297/452.6 |

FOREIGN PATENT DOCUMENTS

DE         10025734 A1   12/2001
DE    102007008018 A1    8/2008

* cited by examiner

*Primary Examiner* — Laurie Cranmer
(74) *Attorney, Agent, or Firm* — Quarles & Brady LLP

(57) ABSTRACT

A seat cushion has a plurality of foamed-in fastening elements, in particular for utilization in vehicle seats, wherein the fastening element is formed by a flat retainer element having a fastening web connected thereto and serving as a counter-retainer. The retainer element is foamed into the foam body of the seat cushion, wherein the counter-retainer is not covered by the foam body of the seat cushion. A stitching wire fastened at the cushion cover can thus be connected to the counter-retainer in a load-transmitting manner.

13 Claims, 3 Drawing Sheets

SEAT CUSHION WITH FOAMED-IN FASTENING ELEMENT

CROSS REFERENCE TO RELATED APPLICATION

This application claims priority to German Patent Application No. 10 2009 043 673.1, filed on Oct. 1, 2009, and German Patent Application No. 10 2009 051 059.1, filed on Oct. 28, 2009, both of which are fully incorporated herein by reference.

STATEMENT REGARDING FEDERALLY SPONSORED RESEARCH OR DEVELOPMENT

Not applicable.

FIELD OF THE INVENTION

The present invention relates to a seat cushion having a plurality of foamed-in fastening elements. Here, the fastening element is composed of a flat stitching element.

BACKGROUND OF THE INVENTION

From the state of the art, a large variety of different retainer elements disposed in seat cushions are known. The retainer elements disposed in the seat cushions serve the purpose of fastening a cushion cover at a seat cushion. To this end, fastening devices implemented in the form of stitching wires are disposed at the cushion cover. These stitching wires are intended to be connected to the fastening element disposed in the seat cushion. During assembly of the cushion cover, the stitching wires are fastened at the fastening elements in the cushion cover either directly or else with the aid of additional connecting elements.

In a simple manner, in the method known from the state of the art, fastening wires are foamed into the seat cushion. This fastening wire is individually formed so as to precisely correspond to the contour of the respective seat and as a rule passes through all fastening positions. This three-dimensionally bent fastening wire is foamed into the seat cushion. A recess is provided at the fastening positions, in order to be able to correspondingly fasten the stitching wire at the fastening element in the foam cushion.

It is a drawback of this embodiment that the wire needs to be individually bent for each seat shape. Moreover, it is necessary to insert the complex wire geometry into the foaming tool. This aspect, however, involves increased complexity of the production process, since the unstable wire structure needs to be inserted in a secure and positionally accurate manner.

In order to solve this problem, document DE 10 2007 008 018 A1 exemplarily describes a fastening element configured as a plate-shaped component. Fastening hooks are arranged in the center of this component. In this regard, it is possible to hook the stitching wire of the cushion cover into the fastening hooks. Thanks to this solution alone a decisive advantage can be attained, since a standard component can be utilized as fastening element for a large variety of different seat shapes.

However, in the implementation of known solutions, comparable to the above-referenced document, two significant drawbacks are encountered. Due to the shape of the clip geometry, the fastening elements can only be effectively made of plastics. On the one hand, this makes the insertion into the tool more difficult. When inserting the plurality of clipping elements, complex robotic operations are required, so as to be able to insert the plurality of fastening elements into the foam body in a positionally accurate manner. Hence, automation expenditure during the production process of the seat cushion is unnecessarily increased and requires the use of special grippers. During utilization of the seat cushion for producing the seat, another drawback is encountered. As a result of the large tolerances in a cushion cover, it is repeatedly necessary to detach the cushion cover from the seat cushion. This gives rise to the aspect that, in case of a clipped-in solution, the clip will frequently break off from the retainer element. In this instance, the entire seat cushion is rendered useless for further utilization, since a means for fastening the cushion cover is no longer available.

SUMMARY OF THE INVENTION

Thus, it is an object of the present invention to suggest a fastening element for a seat cushion, which, on the one hand, can be produced inexpensively, is simple and secure in terms of utilization in the seat cushion and on the other hand enables simple and secure assembly of the cushion cover, likewise in case of repair works.

This object is attained in a seat cushion having foamed-in fastening elements and in an inventive fastening element, such as described and claimed herein.

The inventive seat cushion, in particular for utilization in vehicle seats, includes a plurality of foamed-in fastening elements. The fastening element in a known manner has an essentially flat retainer element that is almost completely or else completely foamed into the foam body of the seat cushion. In addition, the fastening element has a counter-retainer that is not covered by the foam cushion. A stitching wire fastened at the cushion element can thus be connected to the counter-retainer in a load-transmitting manner.

It is a characteristic feature of the invention that the counter-retainer is implemented in the type of a fastening web, the two ends thereof being connected to the retainer element.

Thanks to the inventive design of the fastening element, the advantages of both methods known from the state of the art are combined. The fastening elements can be flexibly positioned, wherein for this purpose, common parts are utilized. Hence, the hitherto necessary bending of a wire so as to match the seat contour and the ponderous handling thereof can be dispensed with. At the same time, however, as is the case in a fastening element implemented in the form of a conventional wire, it is possible to remove the cushion cover jointly with the stitching wire from the seat cushion several times and to reattach the same thereto again. The risk that a clip may break off is thus completely eliminated.

Advantageously the fastening element is integrally made from one metal piece. In this context, the production of the seat cushion, in particular the utilization of the fastening elements in the production tool, can be significantly enhanced if the sheet metal can be positioned and/or retained in the tool with the aid of a magnetic retainer.

Provision is made for the aspect that the fastening element is utilized as a common part for a large variety of different positions. Moreover, it is advantageous for the utilization of the fastening element if it can be used without further control in any optional position, respectively be turned by 180°. It is accordingly necessary to advantageously arrange the fastening web substantially symmetrically in the center of the fastening element. Provided that a multiple, rotatory utilization turned by 180° is unrestrictedly possible it is irrelevant if the outer contour of the fastening element or the recesses in the retainer element or else the bending shape of the retainer element are symmetrical with respect to two planes being arranged vertically to one another and being arranged vertically to the plane of the retainer element.

In the simplest form, the fastening element has a straight shape and extends in one plane, i.e. neither a clip nor fastening hooks are provided, and the fastening element also does not feature a three-dimensional contour matching the seat. In particular, the height of the fastening element is not greater than the material thickness.

In an advantageous embodiment, the fastening element is made from a sheet metal and, for this purpose, is advantageously punched out therefrom. Through selection of a sheet metal thickness, preferably at a maximum of 1.5 mm, but in particular smaller than 1 mm, it is possible, in particular through the punching process, to produce the fastening element inexpensively.

In order to reduce the weight of the fastening element to a minimum and at the same time optimize hold in the foam body, it is advantageous to provide the sheet metal with recesses in the region of the plate-shaped retainer element.

If the selection of a very small material thickness results in insufficient rigidity of the retainer element or the fastening web, it is advantageously possible to reinforce the fastening element with the aid of profile patterns. As a consequence, the height of the fastening element is greater than the material thickness.

In order to simplify assembly of the cushion cover at the stitching wire by means of the connecting element, it is possible to cause the fastening web to protrude beyond the plate-shaped retainer element with the aid of a bent shape. By means of this measure, the option to arbitrarily turn the fastening element by 180° is reduced from three to two rotational axes.

Another advantageous design of the fastening element is attained if a wire is multiply bent. Through selection of the meandering shape, optimal stability with respect to the fastening web and hold in the foam body can be attained. The bends preferably are all disposed in one plane and hence form a flat fastening element having a height that corresponds to the wire diameter.

The fastening element for foaming into a seat cushion, in particular for utilization in vehicle seats, consequently constitutes the inventive component. This component has an essentially flat retainer element that is foamed into the seat cushion, wherein the fastening element has at least one counter-retainer. Consequently, this counter-retainer is not covered by the foam body of the seat cushion and a stitching wire fastened at the cushion cover can thus be connected to the counter-retainer in a load-transmitting manner.

It is a characteristic feature that the counter-retainer is implemented in the type of a fastening web, the two ends thereof being connected to the retainer element.

BRIEF DESCRIPTION OF THE DRAWINGS

In the following figures, the inventive solution is exemplarily outlined.

In the drawings.

DETAILED DESCRIPTION OF THE EXAMPLE EMBODIMENTS

Figure 1:
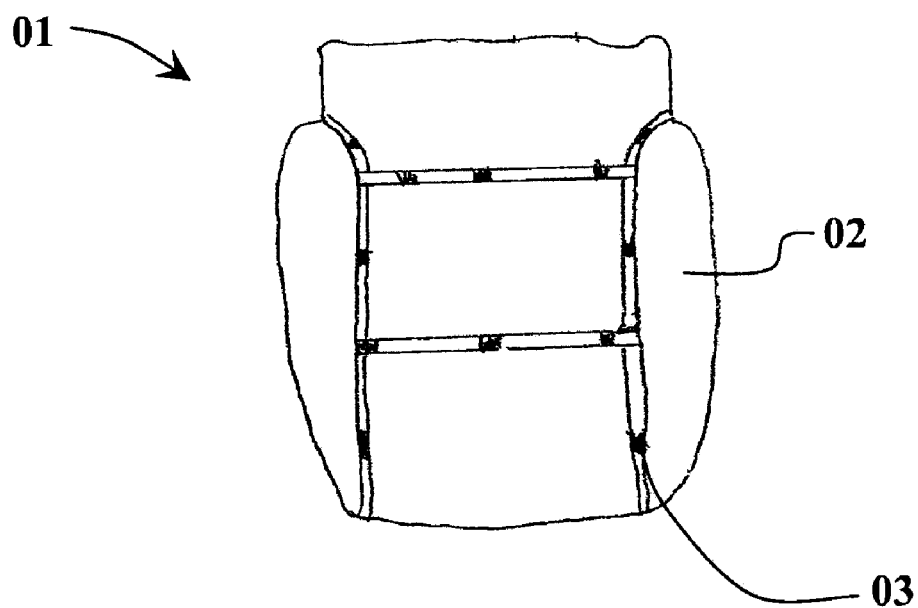
FIG. 1 shows a seat cushion having foamed-in fastening elements.

FIG. 1 exemplarily illustrates a seat cushion 01 that is substantially composed of the foam body 02 and includes several fastening elements 03 foamed into the foam body.

Figure 2:
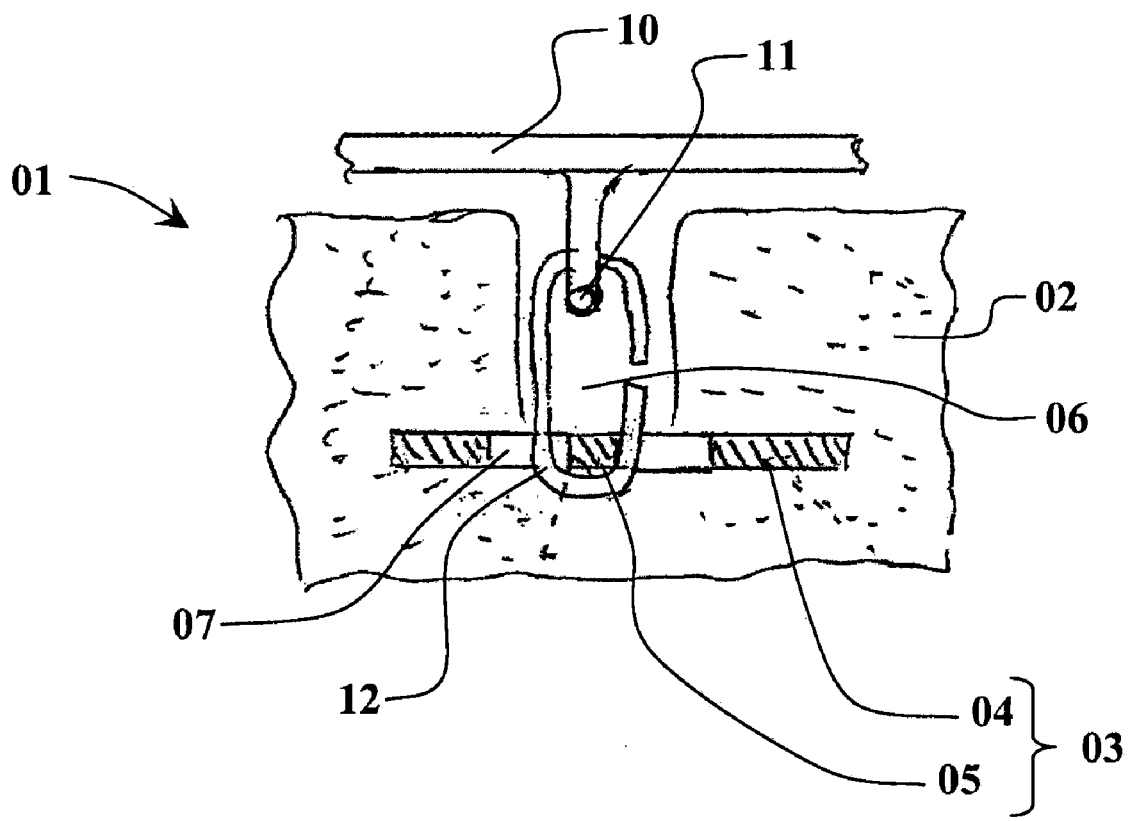
FIG. 2 shows a section through the seat cushion in the region of the fastening element having a cushion cover.

FIG. 2 shows a section through an exemplary solution of a seat cushion having a foamed-in fastening element. The fastening element is composed of the retainer element 04 and the fastening web 05. At least between fastening web 05 and retainer element 04 provision is made for a clearance 07 that is correspondingly required for fastening. The plate-shaped retainer element 04 is substantially completely enclosed by the foam body 02. By contrast, the fastening web 05 is freely accessible from above, so that a corresponding clearance 06 is thus provided in the foam body 02. The cushion cover 10 comprises a stitching wire 11 fixedly connected thereto, by means of which the cushion cover 10 can be fastened at the seat cushion 01. For this purpose, the stitching wire 11 is connected to the fastening web 05 with the aid of a connecting bracket 12.

Figure 3:
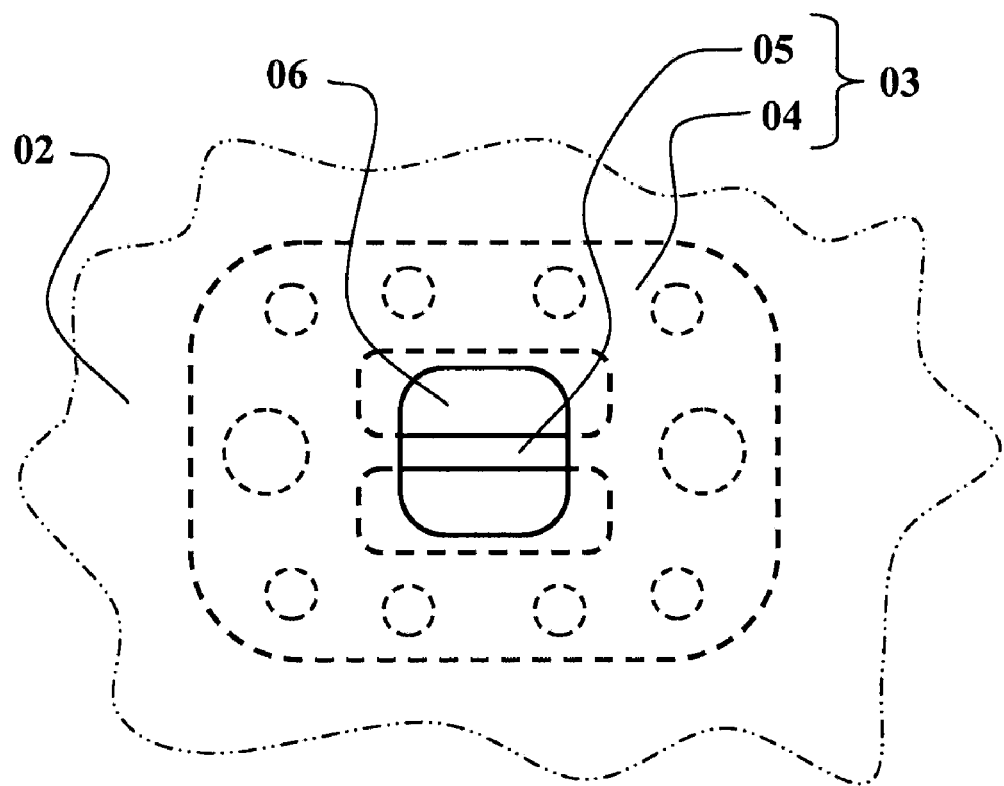
FIG. 3 shows a position of a first embodiment of an exemplary fastening element in the seat cushion.

FIG. 3 shows the position of a first exemplary embodiment of a fastening element 03 in the foam body 02. The fastening element 03 is composed of the substantially completely foamed-in plate-shaped retainer element 04 and the fastening web 05, which is accessible for connection via the clearance 06 in the foam body 02.

Figure 4:
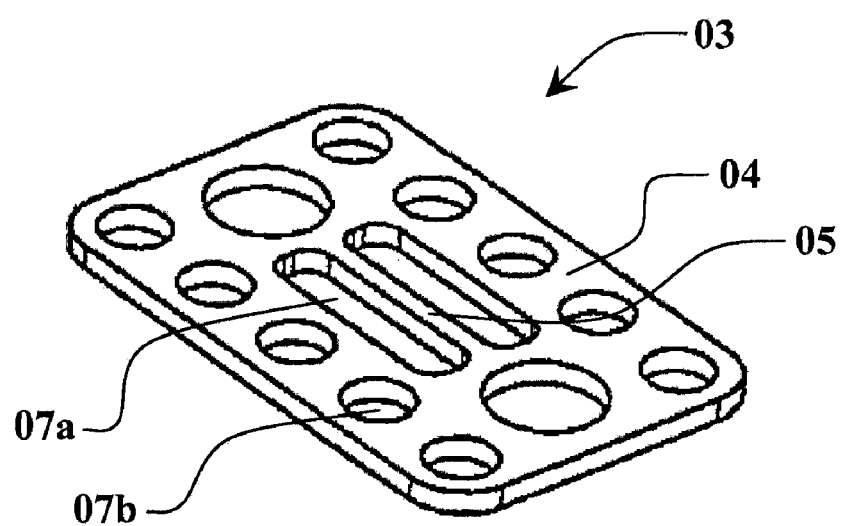
FIG. 4 shows a first exemplary, simply configured embodiment of a fastening element.

FIG. 4 shows a first example of a simple design of the fastening element 03 made from a sheet metal. In this exemplary embodiment, the plate-shaped retainer element 04 is composed of a flat sheet metal having a fastening web 05 equally disposed in the plane. Between fastening web 05 and retainer element 04 provision is made for the clearances 07a, which are mandatory for fastening. In order to ensure improved foaming into the foam body 02, further clearances 07b are provided in the plate-shaped retainer element 04.

Figure 5:
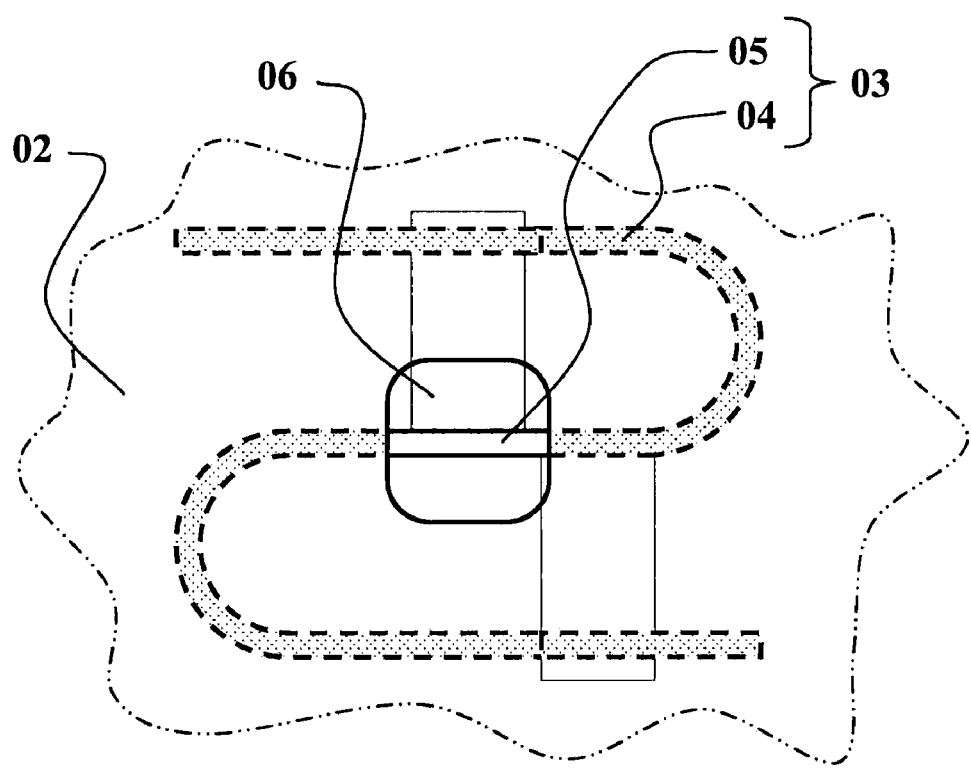
FIG. 5 shows a position of a second embodiment of an exemplary fastening element in the seat cushion.

FIG. 5 shows a second alternative embodiment of the fastening element 03 in the foam body 02 in the same view as that shown in FIG. 3. The fastening element 03 is composed of a wire that, in the simplest form, is doubly bent. The outer legs thus form the retainer element 04 and the center of the bent wire forms the fastening web 05, which is accessible for connection via the clearance 06 in the foam body 02. Hold in the foam body 02 may be further enhanced where necessary by increasing the number of bends, so that it is thus possible to accommodate a longer wire in the foam body 02, preferably in the same space.

Figure 6:
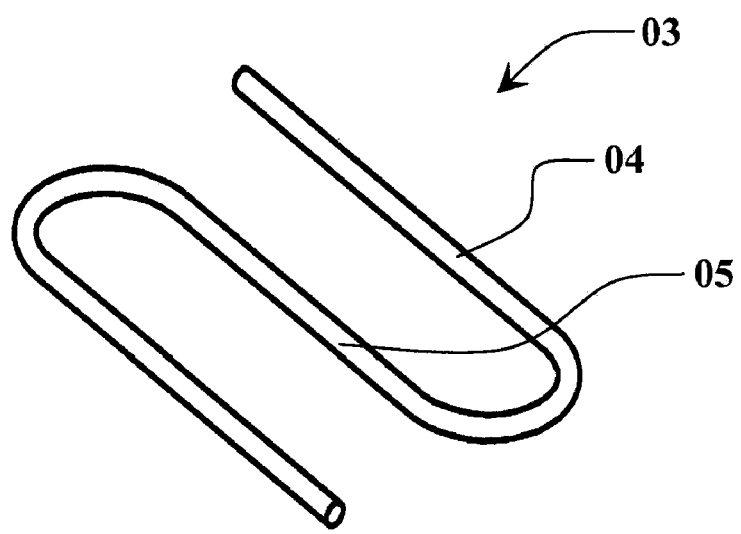
FIG. 6 shows a second exemplary, simply configured embodiment of a fastening element.

FIG. 6 shows a second example of a simple design of the fastening element 03 made from a metal wire. In this exemplary embodiment, the flat retainer element 04 is composed of a flat multiply bent wire having a fastening web 05 equally disposed in the plane.

The invention claimed is:
1. A seat cushion comprising:
a foam body;
a plurality of foamed-in fastening elements, wherein at least one of the fastening elements is a multiply bent wire integrally made from one metal piece having a retainer element foamed into the foam body of the seat cushion, and wherein the at least one fastening element has a single counter-retainer not covered by the foam body of the seat cushion, said counter-retainer being a fastening web having ends connected to the retainer element; and a stitching wire fastened to a cushion cover and connected to the counter-retainer in a load-transmitting manner.

2. The seat cushion according to claim 1, in which the metal piece contains a magnetizable metal, in particular iron.

3. The seat cushion according to claim 1, in which the fastening web is arranged in a center of the fastening element and a rotation of the fastening element by 180° about a first axis and/or a second axis, in particular about a third axis, results in a substantially equal position in terms of the function and extension of the fastening element in the seat cushion, wherein the axes are each arranged vertically with respect to one another.

4. A fastening element for foaming into a seat cushion having a foam body, in particular for utilization in vehicle seats, wherein the fastening element comprises:

an essentially flat multiply bent metal retainer element, the retainer element being foamed into the foam body of a seat cushion; and a single counter-retainer in the form of a fastening web having ends connected to the retainer element, wherein the counter-retainer is not covered by the foam body of the seat cushion, and wherein a stitching wire fastened to the cushion cover can be connected to the counter-retainer in a load-transmitting manner.

5. A seat cushion comprising:

a foam body; and a plurality of foamed-in fastening elements, each of the fastening elements having a retainer element foamed into the foam body of the seat cushion, and wherein each of the fastening elements having a single counter-retainer in the form of a retainer web not covered by the foam body of the seat cushion, said counter-retainer being a fastening web having ends connected to the retainer element; and stitching wire fastened to a cushion cover and connected to each counter-retainer in a load-transmitting manner.

6. The seat cushion according to claim 5, in which the fastening element is integrally made from one metal piece.

7. The seat cushion according to claim 6, in which the metal piece contains a magnetizable metal, in particular iron.

8. The seat cushion according to claim 6, in which the metal piece is made from a sheet metal having a thickness smaller than 1.5 mm.

9. The seat cushion according to claim 8, in which the sheet metal features clearances in the region of the retainer element.

10. The seat cushion according to claim 8, in which the sheet metal is rigid in a region of at least one of the retainer element and the fastening web.

11. The seat cushion according to claim 6, in which the metal piece is composed of a multiply bent metal wire.

12. The seat cushion according to claim 5, in which the fastening web is arranged in a center of the fastening element and a rotation of the fastening element by 180° about a first axis and/or a second axis, in particular about a third axis, results in a substantially equal position in terms of the function and extension of the fastening element in the seat cushion, wherein the axes are each arranged vertically with respect to one another.

13. The seat cushion according to claim 5, in which the fastening element has a planar straight shape.

* * * * *